(12) United States Patent
Hewitt et al.

(10) Patent No.: US 9,033,585 B2
(45) Date of Patent: May 19, 2015

(54) SPHERICAL ROLLER BEARING CAGE WITH INWARD FLANGE TURNED RADIALLY OUTWARD

(71) Applicant: Baldor Electric Company, Fort Smith, AR (US)

(72) Inventors: William Gregory Hewitt, Taylors, SC (US); Christopher E. Hosmer, Greer, SC (US)

(73) Assignee: Baldor Electric Company, Fort Smith, AR (US)

( * ) Notice: Subject to any disclaimer, the term of this patent is extended or adjusted under 35 U.S.C. 154(b) by 0 days.

(21) Appl. No.: 14/036,350

(22) Filed: Sep. 25, 2013

(65) Prior Publication Data

US 2014/0334761 A1    Nov. 13, 2014

Related U.S. Application Data

(60) Provisional application No. 61/820,239, filed on May 7, 2013.

(51) Int. Cl.
*F16C 33/48* (2006.01)
*F16C 33/46* (2006.01)

(52) U.S. Cl.
CPC ............ *F16C 33/467* (2013.01); *F16C 33/4676* (2013.01)

(58) Field of Classification Search
CPC ............. F16C 33/4682; F16C 33/4647; F16C 33/4658; F16C 33/4664; F16C 33/547; F16C 33/548
USPC ......................................... 384/572, 574–576
See application file for complete search history.

(56) References Cited

U.S. PATENT DOCUMENTS

| | | |
|---|---|---|
| 5,051,006 A | 9/1991 | Van Voorthuijsen |
| 5,234,274 A | 8/1993 | Honda et al. |
| 5,474,388 A | 12/1995 | Kellstrom et al. |
| 5,538,348 A | 7/1996 | Honda et al. |
| 5,586,826 A | 12/1996 | Kellstrom et al. |
| 5,626,426 A | 5/1997 | Honda et al. |
| 2008/0037921 A1 * | 2/2008 | Hoshino ...................... 384/558 |
| 2010/0074569 A1 | 3/2010 | Matsushita |

(Continued)

FOREIGN PATENT DOCUMENTS

| | | |
|---|---|---|
| FR | 2925943 A1 | 7/2009 |
| WO | 2011/064133 A1 | 6/2011 |

OTHER PUBLICATIONS

U.S. Appl. No. 14/262,100, filed Apr. 25, 2014.

(Continued)

*Primary Examiner* — Phillip A Johnson
(74) *Attorney, Agent, or Firm* — Thompson Coburn LLP

(57) ABSTRACT

A roller bearing cage has a cage element adapted for retaining the generally cylindrically shaped rollers and allowing the rollers to be rollable therein. The cage element includes a main portion having a plurality of pockets, an outward flange portion extending outwardly in a radial direction and an inward flange portion extending outwardly in the radial direction. The outward flange portion is formed on a side edge of the main portion and the inward flange is formed on an opposite side edge portion thereof. The main portion defines the smallest diameter of the bearing cage and is less than the roller pitch diameter.

21 Claims, 6 Drawing Sheets

(56) References Cited

U.S. PATENT DOCUMENTS

2011/0116734 A1 5/2011 Umemoto et al.
2011/0255820 A1 10/2011 Caspall et al.

OTHER PUBLICATIONS

International Search Report and Written Opinion for PCT/US2014/036611 dated Nov. 14, 2014.

* cited by examiner

SPHERICAL ROLLER BEARING CAGE WITH INWARD FLANGE TURNED RADIALLY OUTWARD

RELATED APPLICATION DATA

This application claims the benefit of provisional application Ser. No. 61/820,239 filed May 7, 2013, the disclosure of which is incorporated by reference herein.

BACKGROUND

This disclosure pertains to a roller bearing with an outer race, an inner race, a plurality of rollers, and a pair of cages. The cages have an inward flange that is turned radially outward.

DESCRIPTION OF THE DRAWINGS

The accompanying drawings, which are incorporated in and form a part of the specification, illustrate the embodiments. In the drawings.

DETAILED DESCRIPTION

Figure 1:
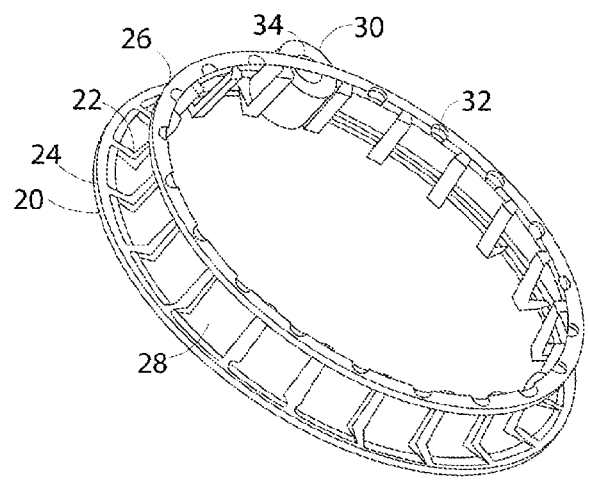
FIG. 1 illustrates a perspective view of a bearing cage.
Figure 4:
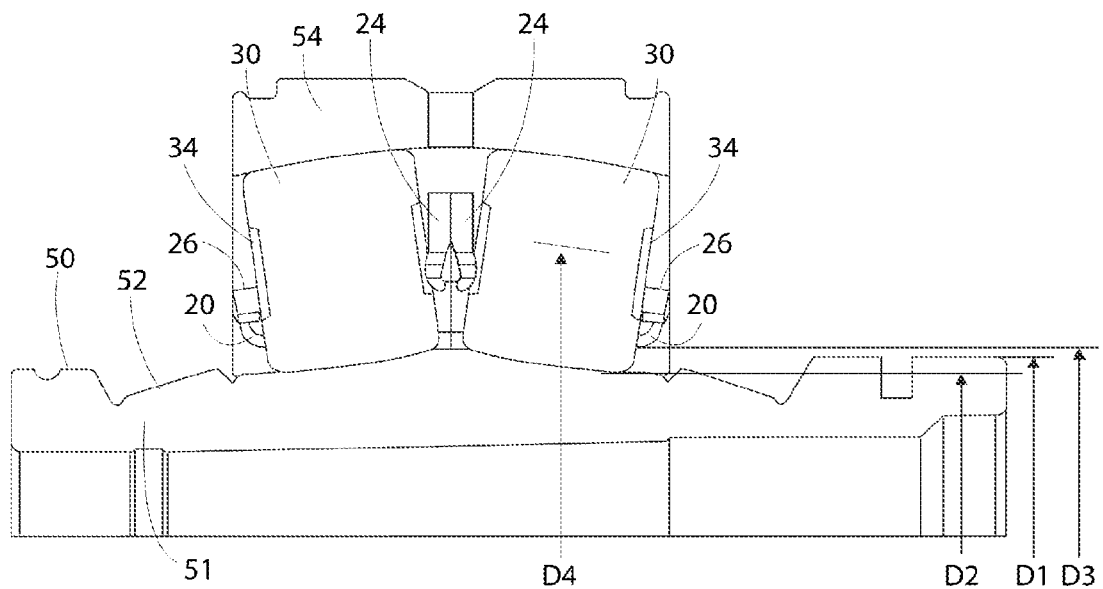
FIG. 4 illustrates an enlarged partial cross sectional view of a bearing with which the bearing cage of FIG. 1 is assembled.
Figure 3:
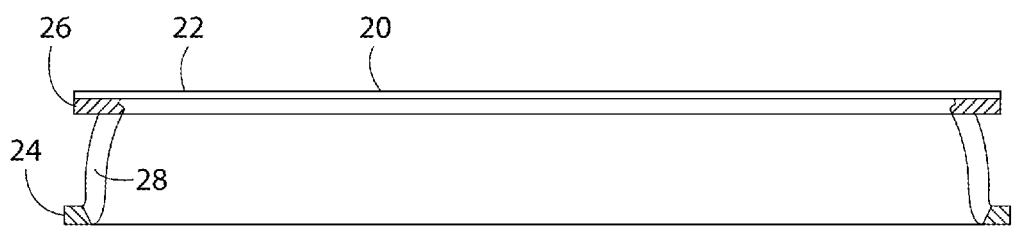
FIG. 3 illustrates a cross sectional view of the bearing cage of FIG. 1.

FIG. 1 shows an exemplary cage 20, which may be used for a roller bearing, for instance, a self-aligning spherical roller bearing. The cage 20 may be formed by press-molding or stamping a metal plate or by injection-molding a synthetic resin. The cage has a main portion 22, an outward flange portion 24 extending outwardly in the radial direction from a side of the main portion, and an inward flange portion 26 extending outwardly in the radial direction from the opposite side of the main portion. A plurality of pockets 28 is formed in the main portion 22. Each pocket retains 28 a single generally cylindrically shaped roller 30 that is rollable therein. In FIG. 1, the main portion 22 disposed between the pockets 28 defines the inner diameter surface of the cage D3 and the inward flange 26 extends outward therefrom. FIG. 4 shows additional detail with the inner most inner diameter of the cage indicated by D3. Thus the main portion 22 disposed between the pockets 28 defines bridges and the inward flange 26 extends radially outward therefrom. The inward flange 26 may be turned radially outward from the main portion 22 so that the main portion 22, for instance, the bridges defined by the pockets, may define the innermost surface of the cage. As shown in FIG. 3, the main portion 22 may be conically shaped so the outward flange portion extends radially outward from a larger diameter side of the main portion and the inward flange portion extends radially outward from a small diameter side of the main portion, the smaller diameter portion being indicated by D3. The main portion may also be cylindrical rather than conical. By turning inward flange radially outward from the main portion, the overall rigidity of the cage may be maintained and provide the necessary clearance for use of the cage with an extended inner ring bearing style as explained below (see, e.g., FIG. 4). Preferably, the inward flange is turned at an angle 90° relative to the bridges.

To prevent the generally cylindrically shaped rollers from pulling out of the pockets in the radial direction, tongues or roller retainers may be provided adjacent the pockets. FIGS. 5-7A,7B show an embodiment of the cage with the roller retainer 32' formed on the outward flange 24. FIGS. 8-11 show an embodiment of the cage with the roller retainer 32 formed on the inward flange 26. The roller retainers 32,32' are preferably arranged in the center of each of the pockets 28 and engage recessed portions 34 in axial faces of the rollers 30. The roller recess portions 34 may be circular in shape and located at the center of ends of the barrel-shaped rollers 30. The recesses formed on the ends of the barrel-shaped rollers may also have an annular shape that is concentric with the barrel-shaped rollers. The roller retention feature or retainer 32,32' formed on the inward flange may be machined, stamped, or coined.

FIG. 4 shows an exemplary extended inner ring bearing that may be used in connection with the above described bearing cage. The extended inner ring bearing 50 has an inner ring 51 with an extension portion 52 and an outer ring 54 supercircumjacent to the inner ring with the rollers 30 disposed therebetween. Because the inward flange 26 extends radially outward, the bearing cage 30 has radial clearance to allow its use in connection with the bearing 50 having with the inner ring extended portion 51. Typically, the extended inner ring bearing inner ring extension portion 52 has an outer diameter surface with a diameter D1 that is greater in dimension than a diameter D2 of the outer diameter surface of the inner ring race. By forming the roller bearing cage inward flange 26 to extend radially outward, the inner most inner diameter D3 of the bearing cage 20 may be sized to allow it to be directed over the outer diameter surface D1 of the inner ring extension portion 52. By outwardly turning the inward flange 26, sufficiently material may be added to the inward flange (i.e., a relatively large outer diameter) to provide the bearing cage with overall rigidity and strength. The bridges of the main portion 22 may be formed in the cage at a diameter, for instance, diameter D3, that is less than the roller pitch D4. This eliminates the need to use other components such as guide rings and other bridges that separate the rollers at a diameter greater than the roller pitch. Moreover, the outwardly turned inner flange provides a location on the inner flange for the roller retainer 32. When assembled in the bearing 50, the outward flange portions 24 of a pair of cages 20 are arranged in an abutting arrangement.

As best shown in FIGS. 5-11, the bearing cage may be provided with guide surfaces 60 formed on outward flange 24 for guiding the rollers 30. The guide surface may have cylindrically shaped contact surfaces that contact the axial ends of the rollers 30, so the rollers can be guided with a full line of contact 62 (FIG. 8) across the roller face whether the outer flange portion is in its designed position or skewed from loading or manufacturing inaccuracies.

Figure 2:
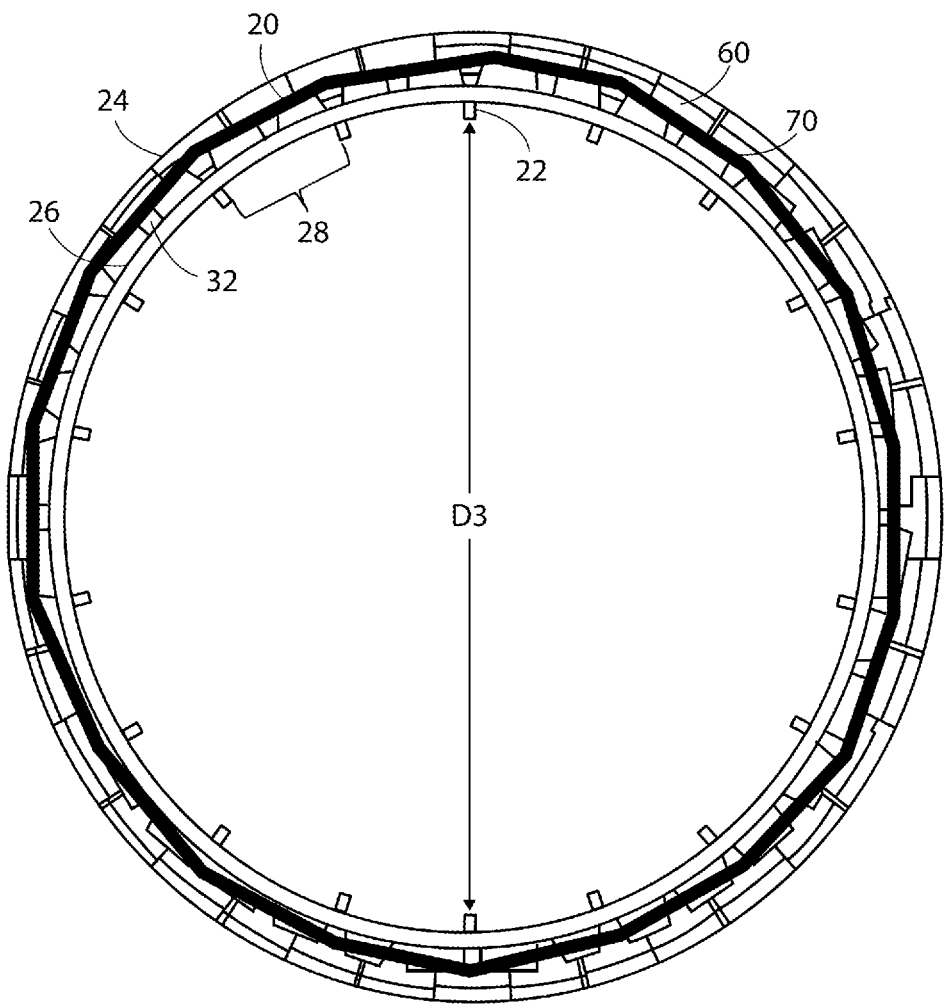
FIG. 2 illustrates a front view of the bearing cage of FIG. 1.
Figure 5:
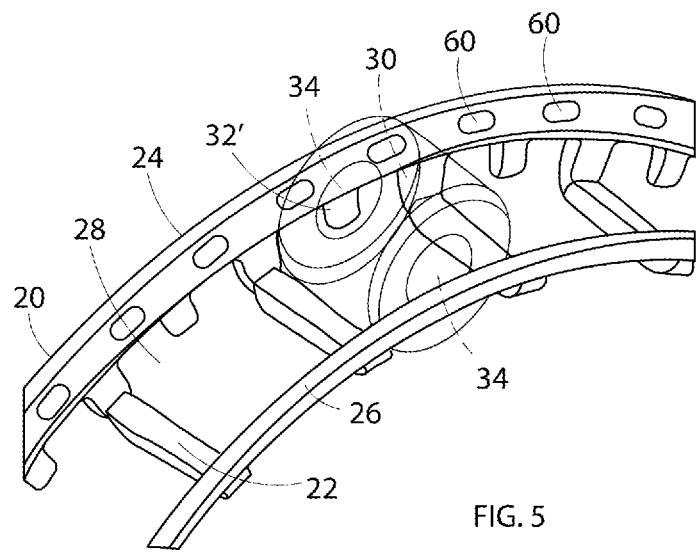
FIG. 5 illustrates a partial enlarged perspective view of an alternate embodiment of the bearing cage of FIG. 1 with a roller shown in phantom.
Figure 6:
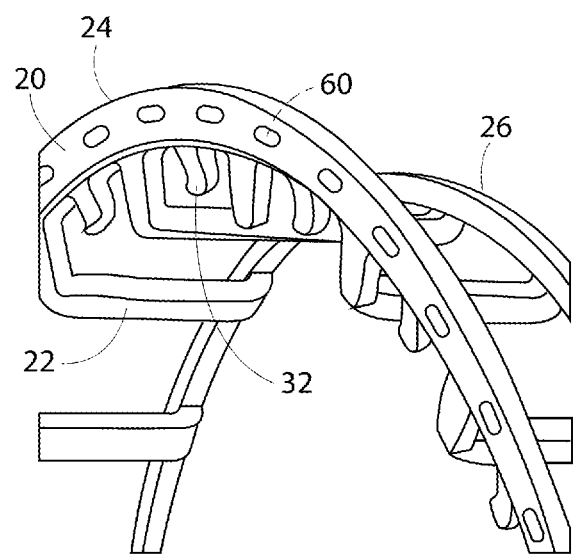
FIG. 6 illustrates a partial enlarged perspective view of the bearing cage of FIG. 5.
Figure 7A:
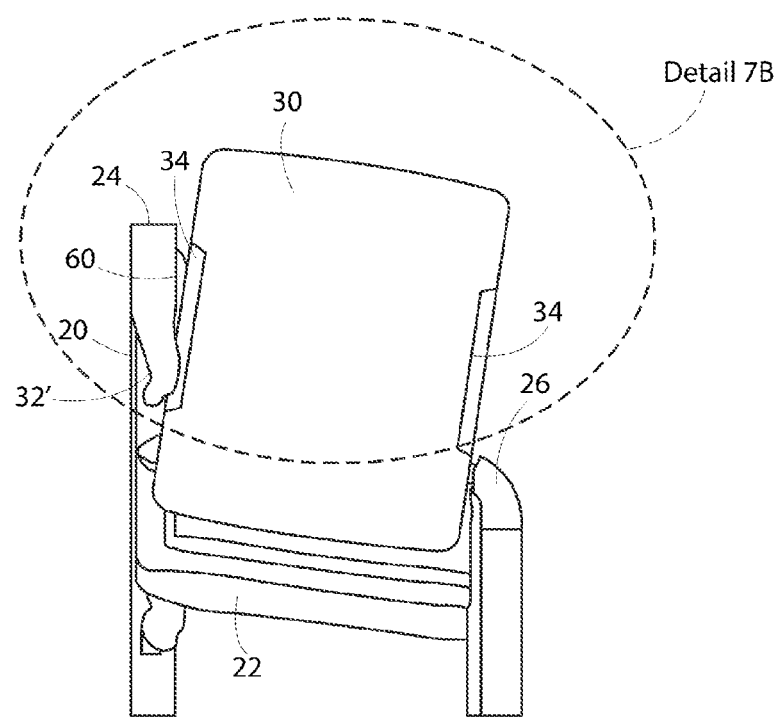
FIG. 7A illustrates a partial enlarged cross sectional view of a bearing cage of FIG. 5.
Figure 7B:
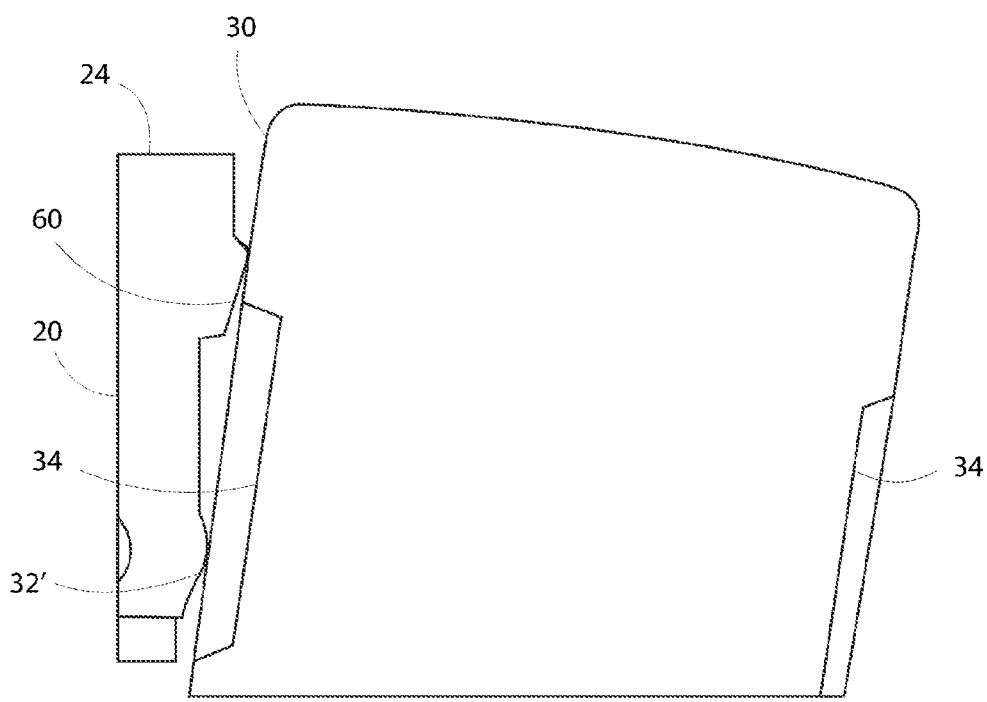
FIG. 7B illustrates detail view 7B of FIG. 7A.
Figure 8:
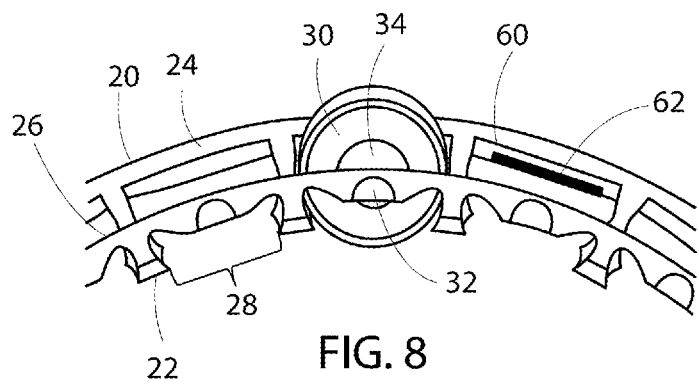
FIG. 8 illustrates a partial enlarged front view of an alternate embodiment of the bearing cage of FIG. 1.
Figure 9:
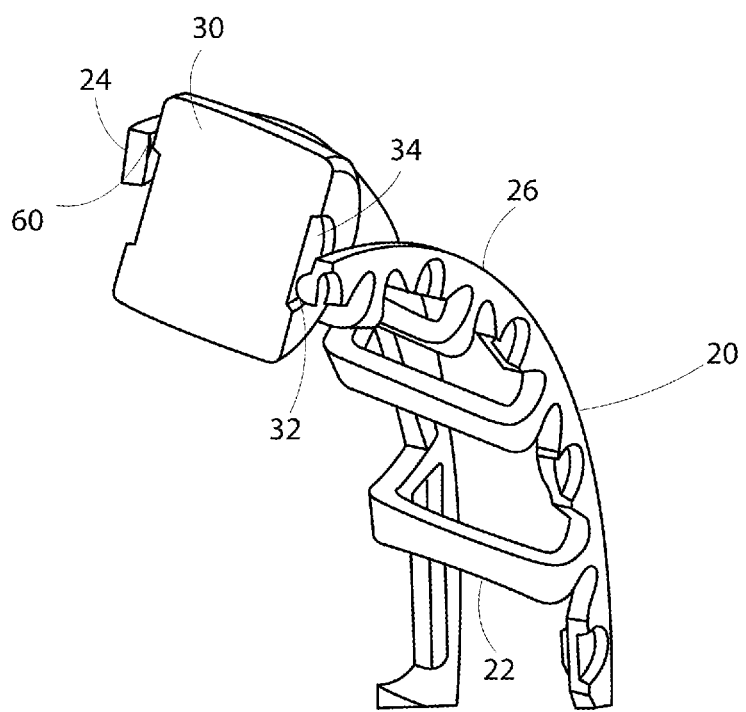
FIG. 9 illustrates a partial enlarged perspective view of the bearing cage of FIG. 8 with a roller shown in cross section.
Figure 10:
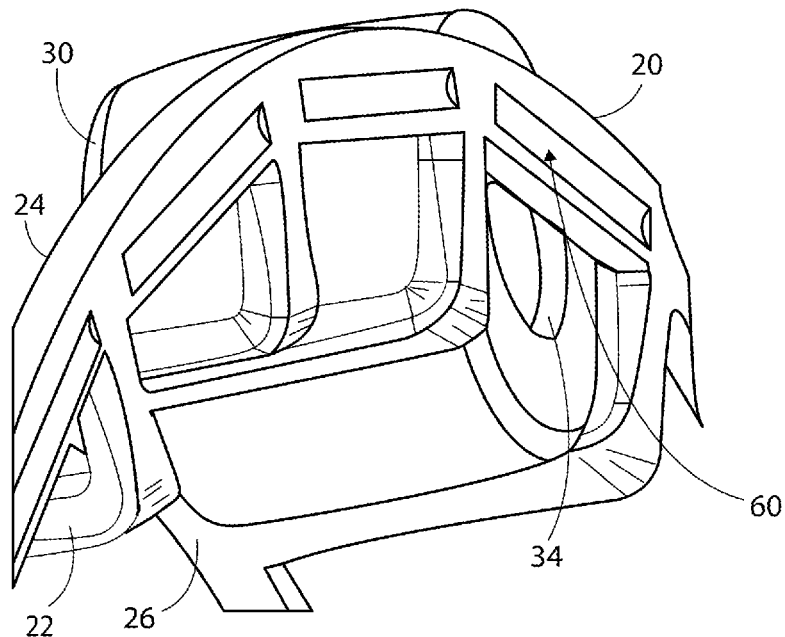
FIG. 10 illustrates a partial enlarged perspective view of the bearing cage of FIG. 8.

The cylindrical shaped guide surfaces 60 may be formed on the outward flange portion 24 adjacent the pockets 28 on the inner side surfaces of the outward flange portion. The guide surfaces may be coined into a cylindrical shape (FIG. 5,6) or otherwise formed as a protrusion (FIGS. 7A,7B). The guide surfaces 60 may be continuous along the pocket 28 (FIG. 8) or may be intermittent (FIGS. 5,6). As best shown in FIG. 8, the guide surfaces 60 may be arranged in a straight line 62 across the pocket, thus defining a polygonal orientation of the guide surfaces on the outward flange. The number of sides to the polygon may correspond to the number of pockets and rollers of the bearing. As shown in FIG. 2, there are 18 pockets defining a 18 sided polygon. The guide surfaces are arranged to correspond to each side 70 of the polygon.

The guide surfaces 60 may be cylindrically shaped and abut against the axial end faces of the rollers substantially uniformly with line contact 62 across the axial end surface of the roller. The line contact improves the lubrication film that should exist between the roller face and guide surfaces. Additionally, providing full line contact across the roller face allows the generally cylindrically shaped rollers to be guided by the guide surfaces with minimal skew no matter if the flanged portion of the cage is stamped in position as designed or is leaning inward or outward. Further, the line of contact enables guiding of the rollers within greater manufacturing tolerances. For instance, a greater variation may be allowed in the stamping and the roller will contact the cylindrical guide surface at a different height on the roller but with full line contact. The cylindrical shape design enhances lubrication in between the roller and the cage guide surface regardless of the direction of rotation or manufacturing variance associated with the stamping. By forming the inward flange to extend radially outward, the inward flange may be formed with the roller retainer, and the outward flange may be provided with a more robust guide surface feature.

Figure 11:
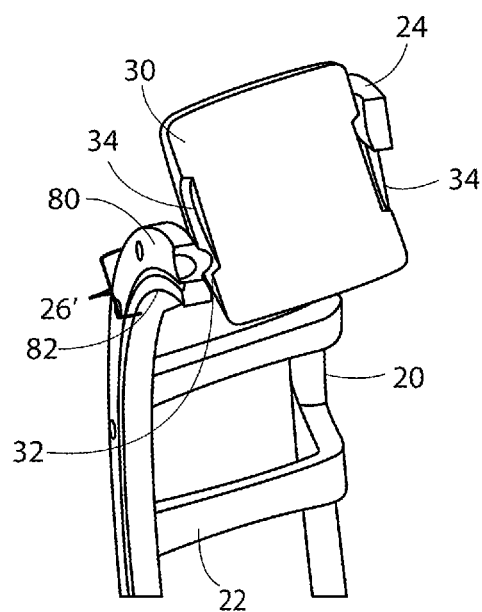
FIG. 11 illustrates a partial enlarged perspective view of an alternate embodiment of the bearing cage of FIG. 1 comprising a two piece assembly with a radial extension member attached to a locator to form an inward flange of the bearing cage.

FIG. 11 show an alternate embodiment of the bearing cage with the inward flange 26' comprising a two-piece assembly. Specifically, the inward flange 26' comprises a ring-like, radially extending member 80 which is fitted onto a locator 82 at the inward most portion of the bridges 22. For instance, it may not be desirable to form the roller retention feature on the inward flange due to manufacturing concerns. Accordingly, for manufacturability, an inward flange comprising a two-piece assembly enables the roller retainer 32 to be formed on the separate ring-like radially extending member 80 which may then be affixed to the locator 82 at the inward-most portion of the bridges.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A roller bearing with a cage comprising:
an outer raceway;
an inner raceway;
a plurality of rollers disposed between the outer raceway and the inner raceway, the rollers being generally cylindrical in shape with a rotational axis acutely angled relative to a rotational center axis of the bearing; and
the cage retaining the rollers, the cage including a main portion having a plurality of pockets allowing the rollers to be rollable therein between the inner and outer raceways, an outward flange portion extending outwardly in a radial direction from the main portion and an inward flange portion extending outwardly in the radial direction from the main portion, the outward flange portion being formed on a side edge of the main portion and the inward flange portion being formed on an opposite side edge portion thereof, the main portion defining an innermost inner diameter surface for the bearing cage.

2. The bearing of claim 1, wherein each of the pockets includes a roller retainer that engages the rollers.

3. The bearing of claim 2, wherein the roller retainer is formed on the inward flange portion.

4. The bearing of claim 1, wherein the inward flange portion, outward flange portion, and main portion are formed monolithically.

5. The bearing of claim 1, wherein the inward flange portion comprises a ring affixed to a locator.

6. The bearing of claim 1, wherein the cage is stamped.

7. The bearing of claim 1, having a second cage adjacent the cage, the second cage including a main portion having a plurality of pockets allowing the rollers to be rollable therein and defining a roller pitch diameter, an outward flange portion extending outwardly in a radial direction from the main portion and an inward flange portion extending outwardly in the radial direction from the main portion, the outward flange portion being formed on a side edge of the main portion and the inward flange portion being formed on an opposite side edge portion thereof, the main portion defining an innermost inner diameter surface for the bearing cage.

8. A roller bearing cage comprising:
a cage element adapted to retain generally cylindrically shaped rollers and allow the rollers to be rollable therein on an axis acutely angled relative to a center axis of the cage element, the cage element including a main portion having a plurality of pockets, an outward flange portion extending outwardly in a radial direction from the main portion and an inward flange portion extending outwardly in the radial direction from the main portion, the outward flange portion being formed on a side edge of the main portion and the inward flange portion being formed on an opposite side edge portion thereof, the main portion defining an innermost inner diameter surface for the bearing cage.

9. The cage of claim 8, wherein each of the pockets includes a roller retainer that engages the rollers.

10. The cage of claim 9, wherein the roller retainer is formed on the inward flange portion.

11. The cage of claim 8, wherein the inward flange portion, outward flange portion, and main portion are formed monolithically.

12. The cage of claim 8, wherein the inward flange portion comprises a ring affixed to a locator.

13. The cage of claim 8, wherein the cage is stamped.

14. A roller bearing with a cage comprising:

an outer ring with an outer race;

an inner ring with an inner race defining an inner raceway diameter, the inner ring having an outer diameter surface greater in dimension than the inner raceway diameter;

a plurality of rollers disposed between the outer race and the inner race, the rollers being generally cylindrical in shape with a rotational axis acutely angled relative to a rotational center axis of the bearing; and the cage retaining the rollers, the cage including a main portion having a plurality of pockets allowing the rollers to be rollable therein between the outer and inner races, and defining a roller pitch, an outward flange portion extending outwardly in a radial direction from the main portion and an inward flange portion extending outwardly in the radial direction from the main portion, the outward flange portion being formed on a side edge of the main portion and the inward flange portion being formed on an opposite side edge portion thereof, the main portion defining a diameter less than the roller pitch, an entirety of the inward flange portion extending radially outward.

15. The bearing of claim 14, wherein each of the pockets includes a roller retainer that engages the rollers.

16. The bearing of claim 15, wherein the roller retainer is formed on the inward flange portion.

17. The bearing of claim 14, wherein the inward flange portion, outward flange portion, and main portion are formed monolithically.

18. The bearing of claim 14, wherein the cage is stamped.

19. The bearing of claim 14, having a second cage adjacent the cage, the second cage including a main portion having a plurality of pockets allowing the rollers to be rollable therein between the races and defining a roller pitch diameter, an outward flange portion extending outwardly in a radial direction from the main portion and an inward flange portion extending outwardly in the radial direction from the main portion, the outward flange portion being formed on a side edge of the main portion and the inward flange portion being formed on an opposite side edge portion thereof.

20. The bearing of claim 14, wherein a radial outer edge of the inward flange portion defines a circle.

21. A roller bearing with a cage comprising:

an outer ring with an outer race;

an inner ring with an inner race defining an inner raceway diameter, the inner ring having an outer diameter surface greater in dimension than the inner raceway diameter;

a plurality of rollers disposed between the outer race and the inner race, the rollers being generally cylindrical in shape with a rotational axis acutely angled relative to a rotational center axis of the bearing; and the cage retaining the rollers, the cage including a main portion having a plurality of pockets allowing the rollers to be rollable therein between the outer and inner races, and defining a roller pitch, an outward flange portion extending outwardly in a radial direction from the main portion and an inward flange portion extending outwardly in the radial direction from the main portion, the outward flange portion being formed on a side edge of the main portion and the inward flange portion being formed on an opposite side edge portion thereof, the main portion defining a diameter less than the roller pitch;

wherein the inward flange portion comprises a ring affixed to a locator.

\* \* \* \* \*